US010667647B2

(12) United States Patent
Budd

(10) Patent No.: US 10,667,647 B2
(45) Date of Patent: Jun. 2, 2020

(54) OUTDOOR COLLAPSIBLE CONVECTION OVEN

(71) Applicant: Daryl Zadok Budd, Clearfield, UT (US)

(72) Inventor: Daryl Zadok Budd, Clearfield, UT (US)

(73) Assignee: Daryl Zadok Budd, Clearfield, UT (US)

( * ) Notice: Subject to any disclaimer, the term of this patent is extended or adjusted under 35 U.S.C. 154(b) by 181 days.

(21) Appl. No.: 15/983,785

(22) Filed: May 18, 2018

(65) Prior Publication Data

US 2019/0350408 A1 Nov. 21, 2019

(51) Int. Cl.
| | | |
|---|---|---|
| A47J 37/00 | (2006.01) | |
| A47J 37/07 | (2006.01) | |
| A47J 37/06 | (2006.01) | |
| A47J 37/04 | (2006.01) | |
| F24B 1/20 | (2006.01) | |
| F24C 1/16 | (2006.01) | |

(52) U.S. Cl.
CPC .............. *A47J 37/07* (2013.01); *A47J 37/043* (2013.01); *A47J 37/046* (2013.01); *A47J 37/0623* (2013.01); *A47J 37/0763* (2013.01); *F24B 1/205* (2013.01); *F24C 1/16* (2013.01)

(58) Field of Classification Search
CPC ...... A47J 37/046; A47J 37/0623; A47J 37/07; A47J 37/0718; A47J 37/0763; A47J 33/00; F24B 1/205; F24C 1/16; F24C 15/22
See application file for complete search history.

(56) References Cited

U.S. PATENT DOCUMENTS

| | | | |
|---|---|---|---|
| 216,003 | A | 5/1879 | Watson |
| 240,639 | A | 4/1881 | Austin |
| 449,432 | A | 3/1891 | Watson |
| 548,499 | A | 10/1895 | Ashmore |
| 897,459 | A | 9/1908 | Grant |
| 1,216,008 | A | 2/1917 | Stonebridge |
| 1,490,274 | A | 4/1924 | Ivey |
| 2,520,030 | A | 8/1950 | Cliff |
| 2,543,115 | A | 2/1951 | Lindstaedt |

(Continued)

OTHER PUBLICATIONS

Book titled "The Convector Oven—Advanced Fire-Side Cooking" by Daryl G. Budd and published on May 17, 2017 ISBN-10:1533566291 ISBN-13: 978-1533566294.*

(Continued)

*Primary Examiner* — Blake A Tankersley
(74) *Attorney, Agent, or Firm* — Lowenstein Sandler LLP

(57) ABSTRACT

An outdoor portable collapsible outdoor convection oven including a first side plate; a second side plate opposite the first side plate; a bottom plate releasably attached to the first side plate and the second side plate without requiring the use of a separate fastener; a food shelf disposed between the top plate and the bottom plate and releasably attached to the first side plate and the second side plate without requiring the use of a separate fastener; a top plate opposite the bottom plate, wherein the top plate is rotatably and releasably attached to the first side plate and the second side plate; and a back plate rotatably and releasably attached to the first side plate and the second side plate without the use of a separate hinge device and a separate fastener.

20 Claims, 5 Drawing Sheets

(56) References Cited

U.S. PATENT DOCUMENTS

| | | | | |
|---|---|---|---|---|
| 2,580,925 | A | 1/1952 | Jarvis | |
| 2,757,664 | A | 8/1956 | McDowell | |
| 2,921,577 | A * | 1/1960 | Smith | A47J 37/0763 |
| | | | | 126/274 |
| 3,026,866 | A | 3/1962 | Lynch | |
| 4,508,096 | A | 4/1985 | Slattery | |
| 5,243,961 | A | 9/1993 | Harris | |
| 5,983,887 | A | 11/1999 | Bourgeois | |
| 2012/0204852 | A1 * | 8/2012 | Boucher | A47J 37/0763 |
| | | | | 126/30 |
| 2019/0254477 | A1 * | 8/2019 | Skillman | A47J 37/0763 |

OTHER PUBLICATIONS

YouTube video titled "Reflector Oven Bread" by David Canterbury and published on Mar. 9, 2013 and available at https://www.youtube.com/watch?v=A2hwJaZJGLA.*

YouTube video titled "Lightweight Reflector Oven" by IA Woodsman and published on Oct. 11, 2009 and available at https://www.youtube.com/watch?v=66mdWpXzlnA.*

YouTube video titled "Homemade Collapsible Reflector Oven. How I made it and first time use." by Simon and published on Jul. 9, 2017 and available at https://www.youtube.com/watch?v=svzE6XC6ACg.*

* cited by examiner

OUTDOOR COLLAPSIBLE CONVECTION OVEN

BACKGROUND

Outdoor ovens (e.g., reflector ovens) are oftentimes useful for cooking food in an outdoor environment. However, the design of some conventional outdoor ovens leads to inefficient and poor cooking conditions. For example, some conventional outdoor ovens are heavy and therefore not very portable. In another example, some conventional ovens require large amounts of fuel (e.g., wood) to generate the requisite heat to properly cook the food disposed within the oven. In a further example, while cooking the food in the oven, the food is difficult to access which can lead to the inability to rotate the food as needed and/or the risk of burning the user while reaching into the oven to maneuver the food.

BRIEF DESCRIPTION OF THE DRAWINGS

The present disclosure is illustrated by way of example, and not by way of limitation, in the figures of the accompanying drawings.

DETAILED DESCRIPTION

The embodiments of the present disclosure address, among other things, the above-mentioned deficiencies. As will be described in further detail below, embodiments of the present disclosure describes, among other things, a portable collapsible convection oven that includes a first side plate; a second side plate opposite the first side plate; a bottom plate releasably attached to the first side plate and the second side plate without requiring the use of a separate fastener; a food shelf disposed between the top plate and the bottom plate and releasably attached to the first side plate and the second side plate without requiring the use of a separate fastener, where heated air is convected along a bottom surface of the food shelf to a top surface of the food shelf to cook food placed on the top surface of the food shelf; a top plate opposite the bottom plate, wherein the top plate is rotatably and releasably attached to the first side plate and the second side plate without the use of a separate hinge device and a separate fastener, where the top plate is configured to rotate to an open position to enable access to the food on the food shelf and configured to rotate to a closed position to deny access to the food on the food shelf; and a back plate rotatably and releasably attached to the first side plate and the second side plate without the use of a separate hinge device and a separate fastener, wherein the back plate is configured to rotate to an open position to enable access to the food on the food shelf and configured to rotate to a closed position to deny access to the food on the food shelf.

As will be described in further detail below, embodiments of the present disclosure describes, among other things, a convection oven comprising a first side plate, a second side plate opposite the first side plate, a bottom plate releasably attached to the first side plate and the second side plate, a top plate opposite the bottom plate, wherein the top plate is rotatably and releasably attached to the first side plate and the second side plate, a back plate rotatably and releasably attached to the first side plate and the second side plate, and a shelf disposed between the top plate and the bottom plate, wherein the shelf is releasably attached to the first side plate and the second side plate. Moreover, in some embodiments, the present disclosure described a convection oven system comprising a convection oven and a heat box.

Figure 1:
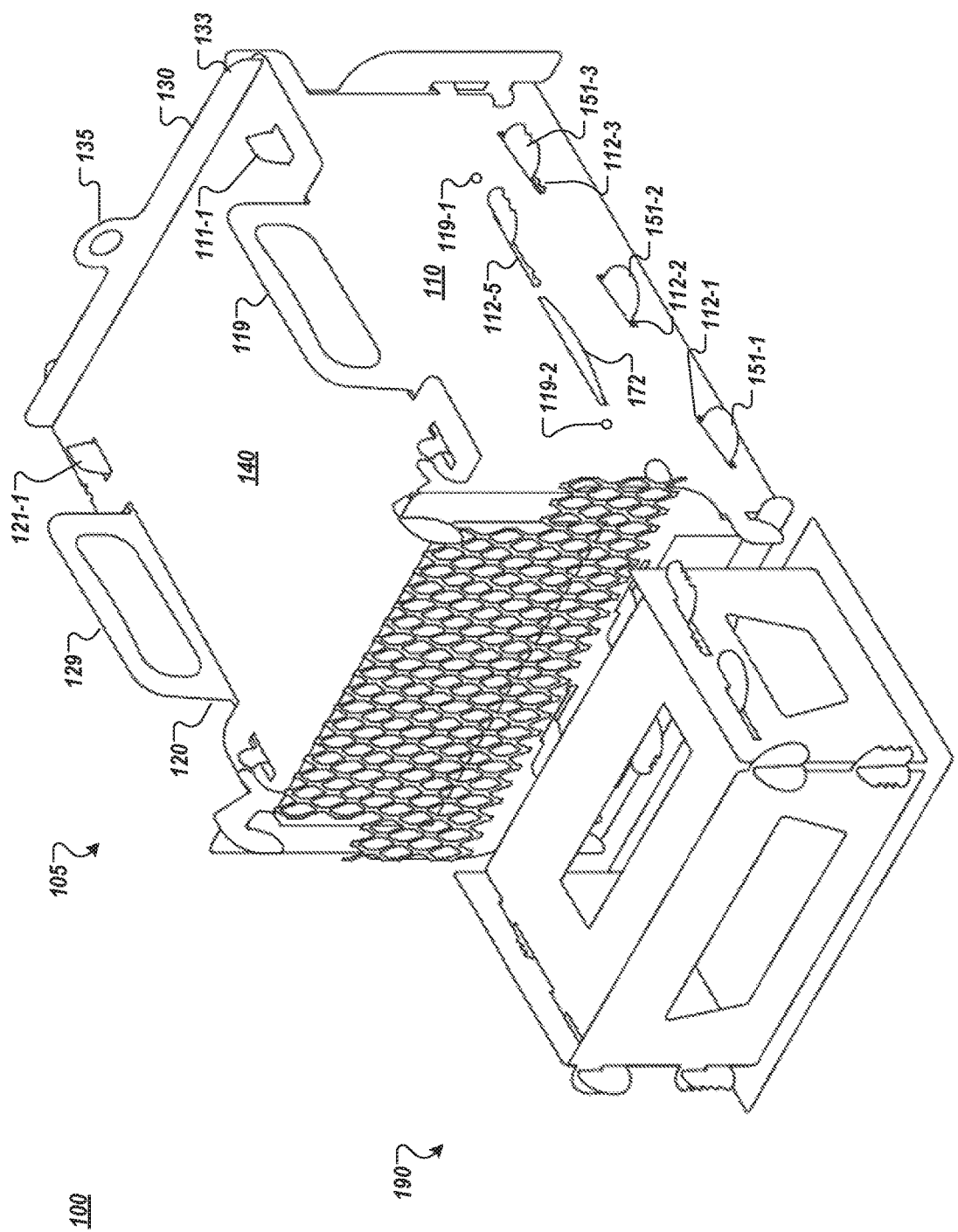
FIG. 1 illustrates a cooking system comprising a convection oven and a heat box, according to an embodiment.

FIG. 1 illustrates an isometric view of convection oven system 100 that includes convection oven 105 and heat box 190. As will be described in further detail below, the individual parts of convection oven system 100 are releasably attached to one another and therefore the convection oven system is collapsible. Moreover, various individual parts of the convection oven system 100 are completely planar which enables a low profile collapsible state of the convection oven system.

Figure 2:
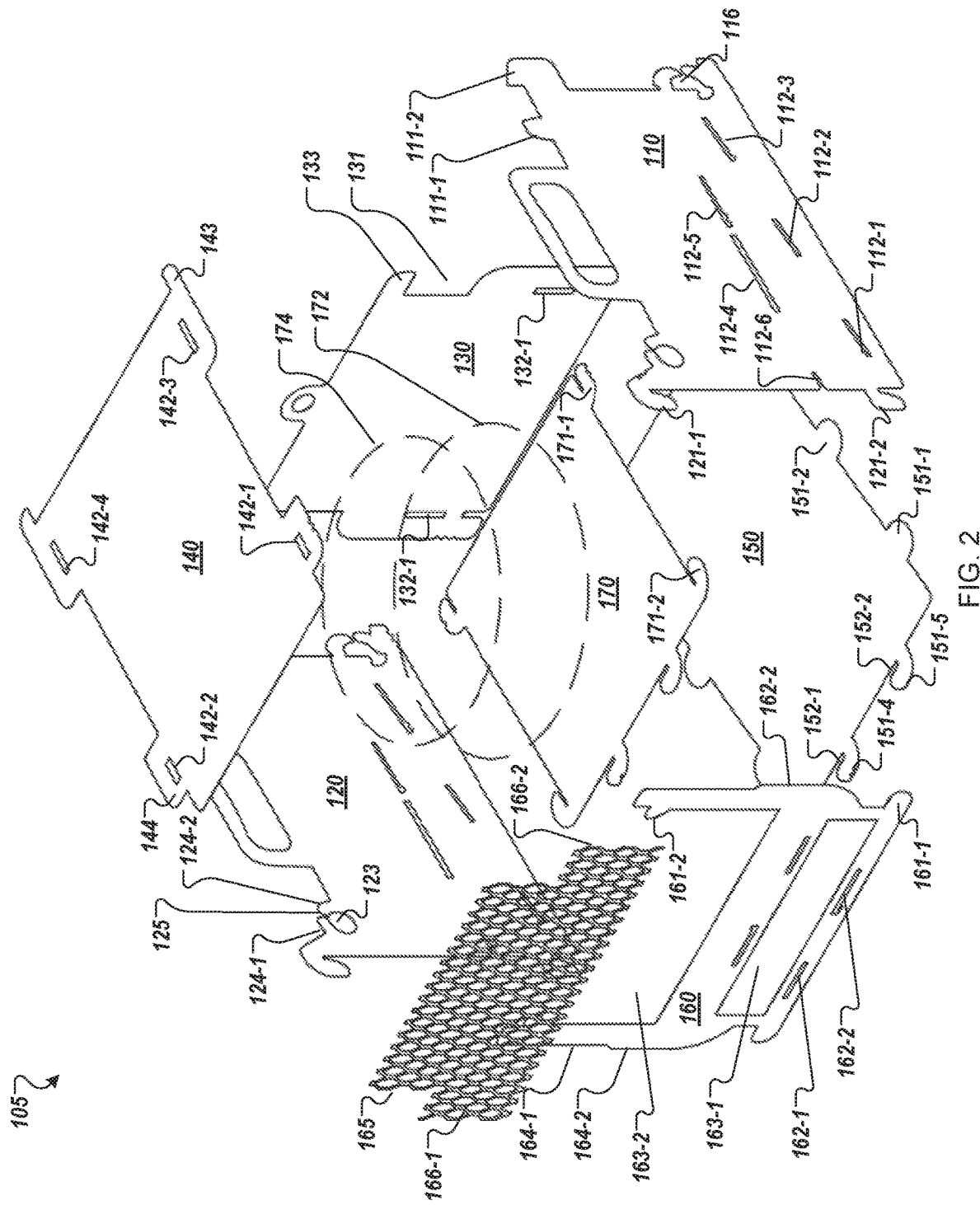
FIG. 2 illustrates an exploded view of the convection oven, according to an embodiment.

FIG. 2 illustrates an isometric exploded view of convection oven 105. Referring now to both FIGS. 1 and 2, convection oven 105 includes side plate 110 and side plate 120 (that is opposite side plate 110). Side plates 110 and 120, in one embodiment, are identical to one another. As such, features/functionality described for one of the side plates (e.g., side plate 110) also applies to the other side plate (e.g., side plate 120). It should be appreciated that various parts (e.g., tabs and slots) described herein have similar features/functionality. As such, features/functionality described for one part also applies to the feature/functionality of a similar part on the same component (e.g., same plate) or applies to the feature/functionality of a similar part on a different component.

Convection oven 105 also includes, among other things, back plate 130, top plate 140, bottom plate 150, front plate 160, mesh plate 165, shelf 170, turntable 172, and food plate 174.

Side plate 110 includes various slots 112 that engage with various tabs of other components of the convection oven, which will be described in further detail below. It should be appreciated that other components of the convection oven also include various slots/tabs that physically engage with respective slots/tabs of other components of the convection oven. In other words, the slots/tabs of various components of the convection oven (and heat box) enables for the respective components to be releasably (and rotatably) attached to one another. Accordingly, the various components of the convection oven system can be quickly assembled/connected to one another and then be quickly disassembled/disconnected from one another after use. It should be appreciated that components of the convection oven system may be releasably attached by attachment features other than slots/tabs.

Due to the releasable connections of the various components of the oven, the oven does not require any separate hinges, fasteners or any type of joining mechanism. That is, for example, a separate and distinct hinge is not necessary for top plate 140 to rotate with respect to side plates 110 and 120 Likewise, a separate and distinct hinge is not necessary for bottom plate 130 to rotate with respect to side plates 110 and 120. Likewise, a separate and distinct fastener (e.g., screw or other physical joining means) is not necessary for bottom plate 150 to mate with side plates 110 and 120.

Bottom plate 150 is disposed between side plate 110 and 120 and also between front plate 160 and back plate 130.

Bottom plate 150, in one embodiment, extends the entire distance between side plate 110 and side plate 120, and the entire distance between front plate 160 and back plate 130.

Bottom plate 150 includes various tabs 151 that engage with various slots of other parts of convection oven 105. For example, tabs 151-1 through 151-3 slide through and engage with slots 112-1 through 112-3 of side plate 110. On the opposite side of bottom plate 150, similar tabs slide through and engage with slots of side plate 120. Bottom plate 150 includes tabs 151-4 and 151-5 that slide through and engage with slots 162-1 and 162-2 of front plate 160. More specifically, the shape of tabs 151-4 and 151-5 form slots 152-1 and 152-2, respectively. Upon tabs 151-4 and 151-5 being inserted in slots 162-1 and 162-2 of front plate 160, respectively, front plate 160 (or bottom plate 150) is then slid laterally such that front plate 160 slides into slots 152-1 and slots 152-2.

As depicted, bottom plate 150 has three tabs that correspondingly mate with three slots of side plate 110. However, bottom plate 150 may have more or less than three tabs that correspondingly mate with slots in side plate 110. It should be appreciated that other components may have more or less tabs/slots, than depicted, to releasably attach to corresponding components.

Shelf 170 is disposed between side plate 110 and side plate 120 and also between front plate 160 and back plate 130. Shelf 170, in one embodiment, extends the entire distance between side plate 110 and side plate 120. In another embodiment, shelf 170 does not extend the entire distance between front plate 160 and back plate 130. Thus, there is a gap between an edge of shelf 170 and back plate 130. This gap allows for heat to flow below and up around shelf 170 (see FIG. 3), which will be described in further detail below.

Shelf 170 includes various tabs that engage with various slots of side plate 110, side plate 120 and front plate 160. For example, tabs 171-1 and 171-2 respectively mate with slots 112-5 and 112-6 of side plate 110. Upon tabs 171-1 and 171-2 being inserted in slots 112-5 and 112-6, respectively, shelf 170 (or bottom plate 110) is then slid laterally such that side plate 110 slides into slots formed by tabs 171-1 and 171-2 (similar to slots 152-1 and 152-2 of bottom plate 150).

Turntable 172 is disposed on shelf 170. Turntable 172 includes a diameter that is larger than the distance between side plate 110 and side plate 120. As such, an outside edge (or periphery) of turntable 172 projects through slot 112-4 of side plate 110 (and also through a similar slot of side plate 120). A user is able to rotate turntable 172 (with respect to shelf 170) by rotating the outside edge of the turntable that extends through slot 112-4. As such, food placed on plate 174 (that is disposed on turntable 172) is able to be rotated during cooking while top plate 140 (and/or back plate 130) is in a closed position. In one embodiment, food plate 174 has a diameter that is less than a diameter of turntable 172 and fits within side plate 110 and side plate 120.

Figure 3:
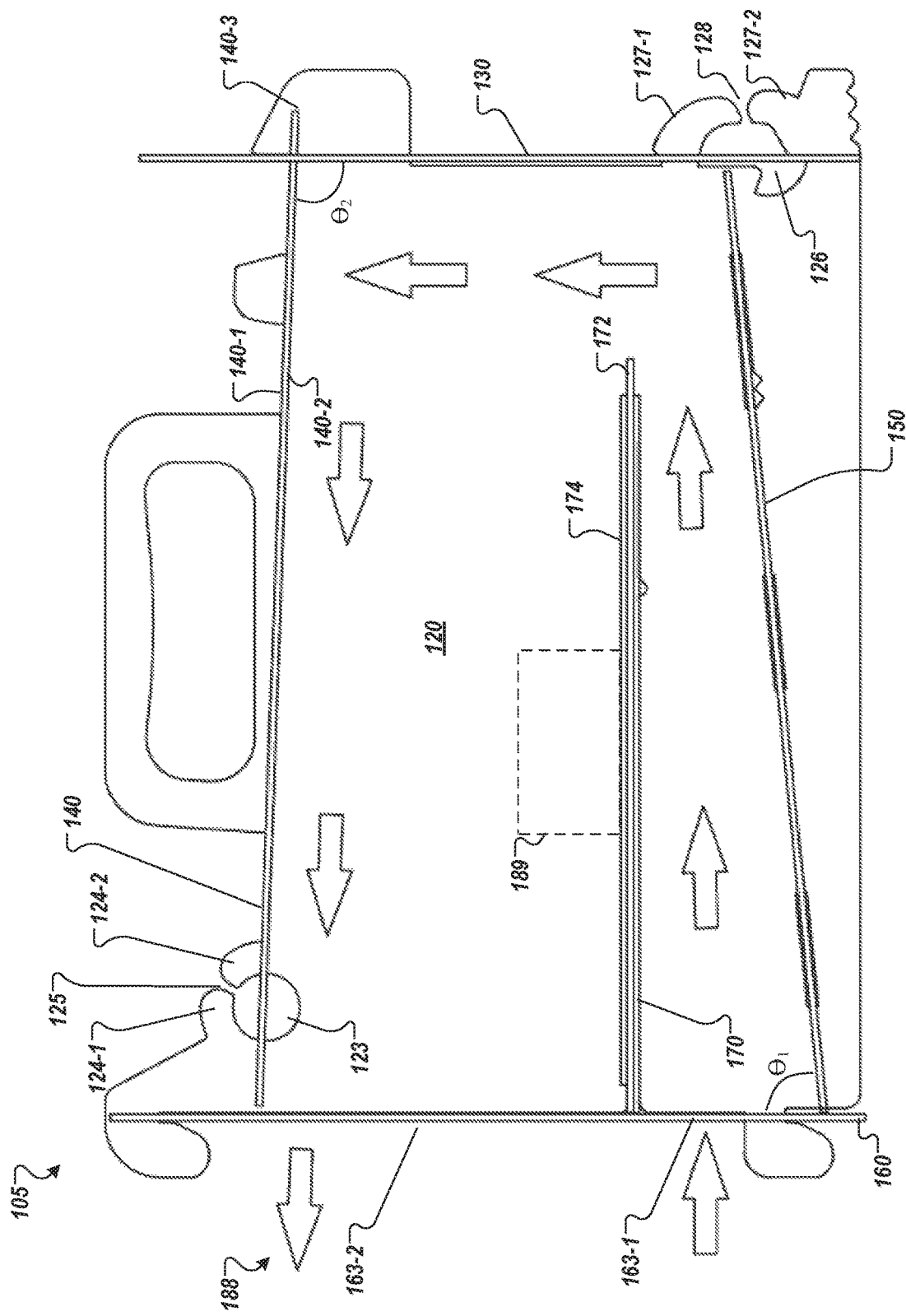
FIG. 3 illustrates a side view of the convection oven, according to an embodiment.

Top plate 140 is disposed on the top of side plate 110 and side plate 120. Top plate 140 extends the length between side plate 110 and side plate 120. Top plate 140, in one embodiment, extends at least the length between front plate 160 and back plate 130. Top plate 140 is rotatably and releasably attached to side plate 110 and side plate 120. Referring to FIGS. 1-3, side plate 110 includes aperture 113 and side plate 120 includes aperture 123. These apertures enable for the releasable attachment and rotation of top plate 140 with respect to side plates 110 and 120.

Aperture 123 is formed by tabs 124-1 and 124-2. Slot 125 is disposed between the distal ends of tabs 124-1 and 124-2.

Figure 4:
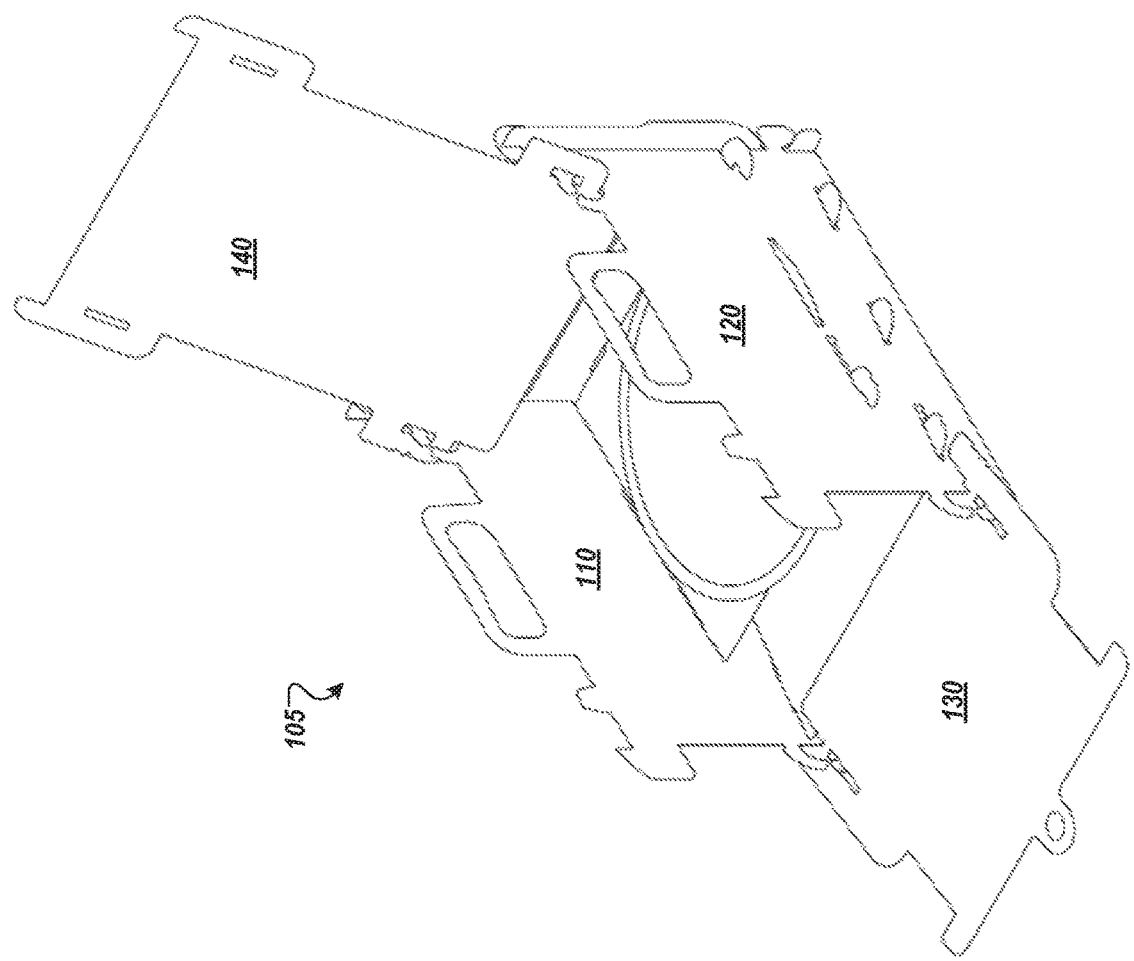
FIG. 4 illustrates the convection oven with the top plate and back plate in an open position, according to one embodiment.

To releasably attach top plate 140 to the side plates, tab 144 of top plate 140 slides into aperture 123 (via slot 125) such that either tab 124-1 or 124-2 of side plate 120 mate with slot 142-2 of top plate 140. For example, in the closed position (e.g., FIG. 3), tab 124-2 mates with slot 142-2. It is noted that while top plate 140 is in the closed position, tab 111-1 mates with slot 142-3 and tab 124-2 mates with slot 142-4. In an open position (e.g., FIG. 4), the top plate rotates (from the closed position) via aperture 123 such that tab 124-1 mates with slot 142-2.

Back plate 130 is disposed along a back edge of side plate 110 and a back edge of side plate 120. Back plate 130 extends the length between side plate 110 and side plate 120. Back plate 130, in one embodiment, extends at least the length between top plate 140 and bottom plate 150. Back plate 130 is rotatably and releasably attached to side plate 110 and side plate 120 (in a similar fashion as top plate 140 is rotatably and releasable attached to the side plates, as described above). Referring to FIGS. 1-3, side plate 110 includes aperture 116 and side plate 120 includes aperture 126. These apertures enable for the releasable attachment and rotation of back plate 130 to side plates 110 and 120. Aperture 126 is formed by tabs 127-1 and 127-2. Slot 128 is disposed between the distal ends of tabs 127-1 and 127-2. Back plate 130 slides into aperture 126 (via slot 128) such that either tab 127-1 or 127-2 of side plate 120 mates with slot 132-1 of back plate 130. For example, in the closed position (e.g., FIG. 3), tab 127-1 mates with slot 132-1. It is noted that while back plate 130 is in the closed position, tab 111-2 mates with slot 131 (where slot 131 is not completely enclosed). In an open position (e.g., FIG. 4), the back plate rotates (from the closed position) via aperture 126 such that tab 127-2 mates with slot 132. In particular, to rotate back plate 130 into an open position (from a closed position), back plate 130 is translated upward (e.g., by a user pulling on handle 135 in an upward direction) such that tab 133 has enough clearance to be translated up and over tab 111-2 of side plate 110.

It should be appreciated that while back plate 130 and top plate 140 are each in the closed position, tab 133 of back plate 130 overlays tab 143 of top plate 140. As a result, top plate 140 is locked between tab 133 of back plate 130 and a top edge of side plate 110. Accordingly, to unlock top plate 140 (such that it can be rotated into an open position), back plate 130 is translated upward (e.g., by a user pulling on handle 135 in an upward direction) such that top plate 140 is no longer locked between tab 133 of the top plate and a top edge of side plate 110, as described above. It is noted that back plate 130 may be translated upward, as described above, while still rotatably and releasably attached to side plate 110 (via aperture 116) and side plate 120 (via aperture 126).

Front plate 160 includes a first opening 163-1 (a fully enclosed opening) and a second opening 163-2 (not a fully enclosed opening). Front plate 160 is releasably attached at least to side plate 110, side plate 120, bottom plate 150 and shelf 170. For example, tabs 151-5 and 151-4 mate with slots 162-2 and 162-1, respectively, as described above. Shelf 170 releasably attaches to front plate in a similar fashion. Additionally, tabs 161-1 and 161-2 mate with side plate 110 via slots formed by tabs 121-2 and 121-1, respectively. Front plate 160 releasably attaches to side plate 120 in a similar fashion.

Mesh plate 165 is releasably attached to front plate 160. Mesh plate 165 may be releasable attached to front plate by various attachment means. In one embodiment, mesh plate 160 includes a first channel (not shown) along edge 166-1 and a second channel (not shown) along edge 166-2. The channels of the mesh plate slide along a side edge (e.g., edge 164-1) of front plate 160 until the mesh plate rests on a tab (e.g., tab 164-2) of the front plate. Mesh plate 165, in various embodiments, prevents coals from falling into the oven and allows the fuel (e.g., wood) to be placed against the front of the oven as needed. In one embodiment, the opening of each diamond shape of the mesh plate has a height of about 2 millimeters (mm) and a width of about 1 mm. In another embodiment, the opening of each diamond shape of the mesh plate has a height of about 25.4 mm and a width of about 9.5 mm.

Referring to at least FIG. 3, food 189 is placed on plate 174 while top plate 140 and back plate 130 are in a closed position. Oven 105 is placed next to a heat source adjacent/near front plate 160 where the heat from the heat source cooks food 189 within oven 105. For example, a user grabs handles 119 and 129 and places oven 105 next to the heat source. In one embodiment, the heat source is fuel (e.g., wood, charcoal, etc.) burning in heat box 190, which will be described in further detail below.

Heat from the heat source, in one embodiment, flows through first opening 163-1 of front plate 160 below and up around shelf 170 and then out second opening 163-2, as shown by arrows 188. This circulation of heat around the food within oven 105 enables convection cooking of food 189. It should be appreciated that oven 105 may be placed in a position such that wind flows in the direction from the back plate 130 to front plate 160. As the air flow crosses over top plate 140 a vacuum is created towards the front of the oven. This vacuum then enhances the circulation of the heat around the food within oven 105 (as indicated by arrows 188).

As depicted in at least FIG. 3, bottom plate 150 is disposed at an angle (e.g., non-90 degree angle, $\theta_1$) with respect to front plate 160 (or with the bottom edge of side plate 120). Likewise, top plate 140 is disposed at an angle (e.g., non-90 degree angle, $\theta_2$) with respect to back plate 130 (or with a back edge of side plate 120). Due the angular placement, the bottom plate and the top plate are not parallel with shelf 170. The angular placement of the top plate and bottom plate, among other things, facilitates in the reflection of infrared (IR) light from the heat source. For example, IR light entering into the oven through opening 163-1 reflects off of bottom plate 150 and onto shelf 170. Additionally, the IR light may reflect up onto top plate 140 and reflect back down onto food 189.

As described above, oven 105 is collapsible via the releasable connection of each of its parts. The individual components, when not connected to one another (in the collapsed state) may be stacked upon each other for storage. In various embodiments, various plates in the oven are flat. This enables for a low profile stacked/collapsible state of the oven.

In one embodiment, one or more components (e.g., plates) of the oven are completely flat (e.g., substantially flat or substantially planar). For example, top plate 140 includes an outside surface (top surface) 140-1 that is completely flat/planar and an inside surface (bottom surface) 140-2 that is completely flat/planar. To further illustrate, top plate 140 includes a perimeter 140-3, where the entirety of the outside surface 140-1 within the perimeter is completely flat/planar and the entirety of the inside surface 140-2 within the perimeter is completely flat/planar. It should be appreciated that the flat/planar features top plate 140, as described above, are also directed to other components of oven 105 (e.g., side plates 110 and 120, back plate 130, bottom plate 150, front plate 160, shelf 170, turntable 172, and plate 174).

In one embodiment, some components (e.g., side plates 110 and 120, back plate 130, top plate 140, bottom plate 150, shelf 170, etc.) are made of a first material (e.g., aluminum) and some components (e.g., front plate 160, mesh plate 165) are made of a second material (e.g., steel).

In one embodiment, various components have one or more storage holes to facilitate in storage of the oven in the collapsible state. The one or more storage holes of each component aligns and corresponds to one or more storage holes of the other components. For example, referring to FIG. 1, side plate 110 has storage holes 119-1 and 119-2. In various embodiments, each of the other components also include similar storage holes. In the collapsed state, side plate 110 can be laid down flat onto a storage tray (not shown), where the storage tray has one or more corresponding posts that align with the storage hole(s). As such, each of the components or plates may be laid down and stacked on one another via alignment of the storage holes with the posts on the storage tray. In one embodiment, a fastener (e.g., wing nut) may be affixed to the top of the posts to secure each of the components stacked on top of one another in the storage tray. In some embodiments, oven 105 and heat box 190, when assembled, are placed on the storage tray.

Figure 5:
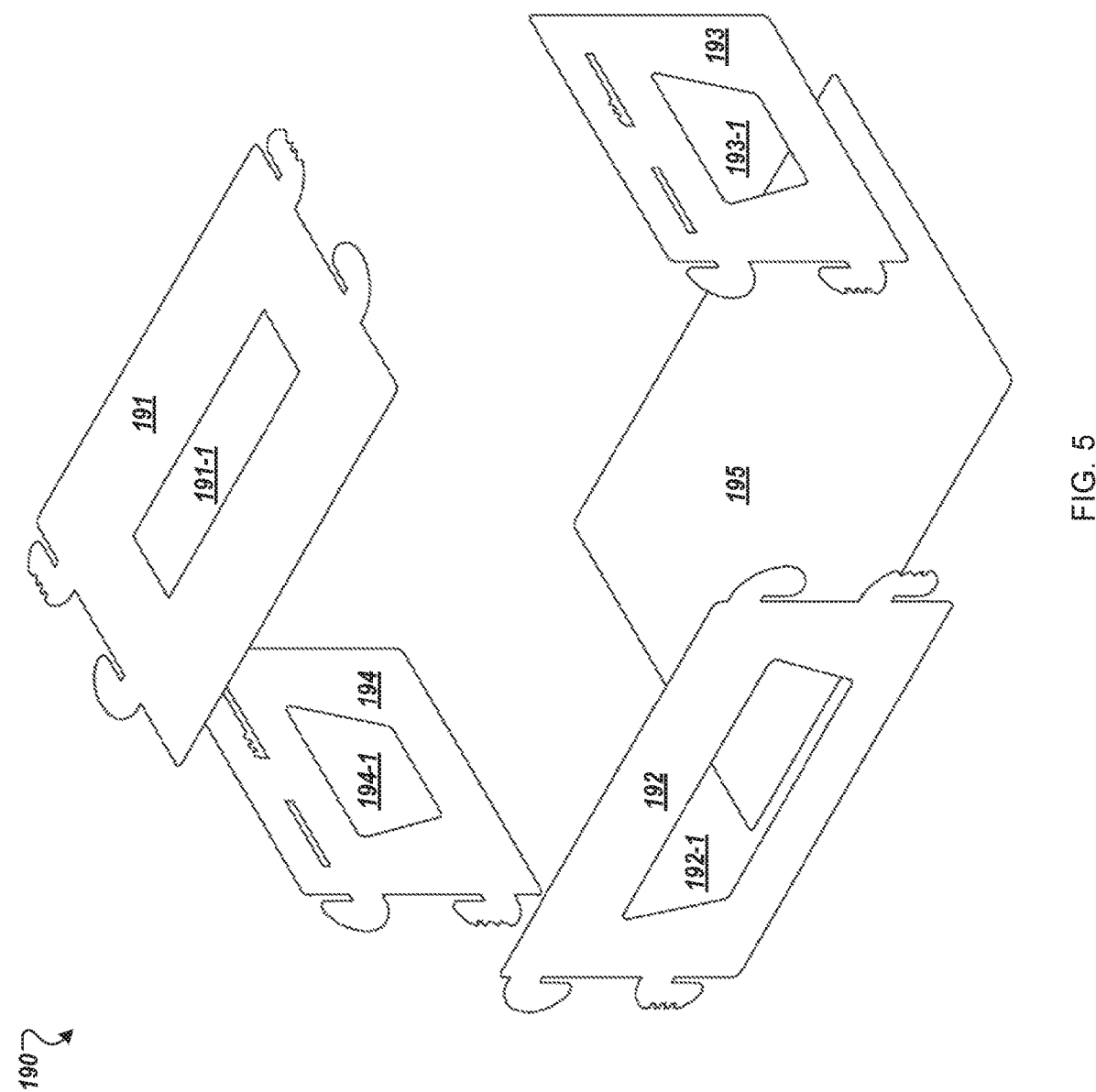
FIG. 5 illustrates an exploded view of the heat box, according to another embodiment.

Referring to FIG. 5, heat box 190 includes top plate 191, front plate 192, side plate 193, side plate 194, and bottom plate 195. At least top plate 191, front plate 192, side plate 193 and side plate 194 are respectively releasably attached to one another in a similar fashion (e.g., tabs/slots) as described above with respect to oven 105. In various embodiments, the plates include an aperture centered in the plate. For example, top plate 191 includes aperture 191-1, front plate 191 includes aperture 192-1, side plate 193 includes aperture 193-1, and side plate 194 includes aperture 194-1. In one embodiment, various components of heat box 190 are made of steel.

Heat box 190, in one embodiment, is disposed in proximity to front plate 160 of oven 105 (see FIG. 1). As described above, fuel is placed on top plate 191 (or within heat box). The heat box enables the fuel to remain in a consolidated and focused location within the heat box. This enables the heat produced by the burning of the fuel to locally emanate from the heat box and directly into oven 105 via, at least, opening 161-1.

The apertures in heat box 191 enable for the requisite oxygen to enter into the heat box for the burning of the fuel, as well as facilitating in the heat to locally emanate from the heat box. Additionally, in one embodiment, fuel may be placed on top of top plate 191. As the fuel (e.g., wood) burns, the coals from the burning wood may fall through aperture 191-1 and into heat box 190.

Similar to oven 105, as described above, due to the releasable connections of the various parts of the heat box, the heat box does not require any separate fasteners or any type of separate joining mechanism. In various embodiments, various plates in the heat box are flat, similar to plates of oven 105. This enables for a low profile stacked/collapsible state of the heat box.

The description below describes an embodiment of assembling oven 105. It should be appreciated that the assembly of oven 105 may be performed in various steps other than the steps provided herein.

First, in one embodiment, shelf 170 is releasably connected to side plate 110 and side plate 120 via the corresponding tabs of shelf 170 and slots of side plates 110 and 120. Next, front plate 160 is releasably connected to shelf 170 via the corresponding tabs of shelf 170 and slots of front plate 160. Next, bottom plate 150 is releasably connected to front plate 160 via the corresponding tabs of bottom plate 150 and slots of front plate 160. Then, bottom plate 150 is releasably connected to side plate 110 and side plate 120 via the corresponding tabs of bottom plate 150 and the slots of side plate 110 and side plate 120.

After the bottom plate of the oven is attached, then releasably attach the front plate with the side plates via tabs of the front plate with the corresponding tabs of the side plates. The mating tabs of the front plate have a slight interference fit with the tabs of the side plates. For example, there is a slight bump on tab 161-2 that the slot formed by tab 121-1 rises over and subsequently seats into place. Gravity holds the side plates in the small notched area in the tabs on the front plate. These tabs mate in order for the sides to reach a vertical position. The purpose of this slight interference fit is to hold these tabs together in the assembled position even when the top of the oven has been removed.

Next, the top plate is releasably and rotatably connected to the side plates via the aperture 123 of side plate 120 and slot 142-2 of the top plate (and similar aperture of side plate 110 and slot 142-1 of the top plate). Next, the back plate is releasably connected to the side plates via aperture 116 of side plate 110 and slot 132-1 of back plate 130 (and similarly aperture 126 of side plate 120 and slot 132-1 of back plate 130. As discussed previously, the back plate is locked in the closed position when tab 133 is placed up and over tab 111-2 side plate 110, and tab 133 rests between tab 111-1 and 111-2. Additionally, this will lock both the top plate and the back plate of the oven closed using the force of gravity.

Next, while top plate 140 and back plate 130 are in an open position, turntable 172 is disposed on shelf 170 where the perimeter of the turntable is inserted in slot 112-4 of the side plate 110. Then plate 174 is placed on top of the turntable.

Finally, mesh plate 165 slides onto front plate 160. In particular, channels of the mesh plate slide along a side edge (e.g., edge 164-1) of front plate 160 until it rests on a tab (e.g., tab 164-2) of the front plate.

It should be appreciated that, in some embodiments, one or more corresponding slots and tabs are visually keyed to facilitate in the assembly of the oven. For example, tab 171-1 of shelf 170 includes two notches. Similarly, slot 112-5 (that tab 171-1 mates with) also has two notches. These visual keys (e.g., notches) indicate to the user that tab 171-1 is to mate with slot 112-5.

The description below describes an embodiment of heat box 190. It should be appreciated that the assembly of heat box 190 may be performed in various steps other than the steps provided herein.

First, bottom plate is set on the ground (or the storage tray). Then, top plate 191 is releasably attached to side plate 193 and side plate 194 via tabs of top plate 191 and corresponding slots of side plate 193 and side plate 194. Finally, front plate 192 is releasably attached via tabs of front plate 192 and corresponding tabs of side plate 193 and side plate 194.

What is claimed is:

1. An outdoor portable collapsible convection oven comprising:
   a first side plate;
   a second side plate opposite the first side plate;
   a bottom plate releasably attached to the first side plate and the second side plate without requiring use of a separate fastener;
   a top plate opposite the bottom plate, wherein the top plate is rotatably and releasably attached to the first side plate and the second side plate without the use of a separate hinge device and a separate fastener;
   a food shelf disposed between the top plate and the bottom plate and releasably attached to the first side plate and the second side plate without requiring the use of a separate fastener; and
   a back plate rotatably and releasably attached to the first side plate and the second side plate without the use of a separate hinge device and a separate fastener, wherein the back plate is configured to rotate to an open position to enable access to food on the food shelf and is configured to rotate to a closed position to deny access to the food on the food shelf, wherein the top plate is configured to rotate to an open position to enable access to the food on the food shelf and is configured to rotate to a closed position to deny access to the food on the food shelf, and
   wherein the outdoor portable convection oven is configured to cause unforced convection of heated air along a bottom surface of the food shelf to a top surface of the food shelf to cook the food placed on the top surface of the food shelf.

2. A collapsible convection oven comprising:
   a first side plate;
   a second side plate opposite the first side plate;
   a bottom plate releasably attached to the first side plate and the second side plate;
   a top plate opposite the bottom plate, wherein the top plate is rotatably and releasably attached to the first side plate and the second side plate;
   a back plate rotatably and releasably attached to the first side plate and the second side plate; and
   a shelf disposed between the top plate and the bottom plate, wherein the shelf is releasably attached to the first side plate and the second side plate,
   wherein the collapsible convection oven is configured to cause unforced convection of heated air along a bottom surface of the shelf to a top surface of the shelf to cook food placed on the top surface of the shelf.

3. The collapsible convection oven of claim 2, wherein a portion of the top plate is disposed between the back plate and each of the first side plate and the second side plate.

4. The collapsible convection oven of claim 2, further comprising:
   a turntable disposed on the shelf, wherein a periphery of the turntable is disposed through a slot of the first side plate and through a slot of the second side plate.

5. The collapsible convection oven of claim 2, wherein the first side plate and the second side plate each comprise:
   a first hinge aperture, wherein the top plate is rotatably and releasably attached within the first hinge aperture of the first side plate to the first side plate and is rotatably and releasably attached within the first hinge aperture of the second side plate to the second side plate; and
   a second hinge aperture, wherein the back plate is rotatably and releasably attached within the second hinge aperture of the first side plate to the first side plate and is rotatably and releasably attached within the second hinge aperture of the second side plate to the second side plate.

6. The collapsible convection oven of claim 2, further comprising:
   a front plate opposite the back plate, the front plate comprising:

a first opening aligned between the shelf and the bottom plate; and a second opening aligned between the top plate and the shelf.

7. The collapsible convection oven of claim 6, further comprising:

a mesh plate overlaying the second opening of the front plate.

8. The collapsible convection oven of claim 2, wherein the bottom plate is disposed non-parallel with respect to the shelf.

9. The collapsible convection oven of claim 2, wherein the first side plate, the second side plate, the bottom plate, the top plate and the back plate each comprise:

an entire outside surface that is entirely planar; and
an entire inside surface that is entirely planar.

10. The collapsible convection oven of claim 2, wherein the collapsible convection oven does not include a separate fastener or a separate hinge.

11. A collapsible convection oven system comprising:

a convection oven comprising:
  a first side plate;
  a second side plate opposite the first side plate;
  a top plate releasably attached to the first side plate and the second side plate;
  a back plate releasably attached to the first side plate and the second side plate; and
  a shelf opposite the top plate and releasably attached to the first side plate and the second side plate,
  wherein at least the first side plate, the second side plate, the top plate and the back plate each comprise a periphery, wherein an outside surface extending within the periphery is entirely planar and an inside surface extending within the periphery is entirely planar, and
  wherein the convection oven is configured to cause unforced convection of heated air along a bottom surface of the shelf to a top surface of the shelf to cook food placed on the top surface of the shelf.

12. The collapsible convection oven system of claim 11, further comprising:

a heat box comprising:
  a first heat box side plate;
  a second heat box side plate opposite the first heat box side plate;
  a heat box top plate releasably attached to the first heat box side plate and the second side plate; and
  a front plate extending between the first heat box side plate and the second heat box side plate, wherein the front plate is releasably attached to the first heat box side plate and the second heat box side plate.

13. The collapsible convection oven system of claim 12, wherein each of the first heat box side plate, the second heat box side plate, the heat box top plate and the front plate of the heat box comprise a centered aperture.

14. The collapsible convection oven system of claim 12, wherein at least the first heat box side plate, the second heat box side plate, the heat box top plate and the front plate of the heat box each comprise a heat box periphery, wherein a heat box outside surface extending within the heat box periphery is entirely planar and a heat box inside surface extending within the heat box periphery is entirely planar.

15. The collapsible convection oven system of claim 11, wherein the convection oven further comprises:

a turntable disposed on the shelf, wherein the turntable extends through a slot of the first side plate and through a slot of the second side plate.

16. The collapsible convection oven system of claim 11, wherein the first side plate and the second side plate of the convection oven each comprise:

a first hinge aperture, wherein the top plate is rotatably and releasably attached within the first hinge aperture of the first side plate to the first side plate and is rotatably and releasably attached within the first hinge aperture of the second side plate to the second side plate; and a second hinge aperture, wherein the back plate is rotatably and releasably attached within the second hinge aperture of the first side plate to the first side plate and is rotatably and releasably attached within the second hinge aperture of the second side plate to the second side plate.

17. The collapsible convection oven system of claim 11, wherein the convection oven further comprises:

a bottom plate releasably attached to the first side plate and the second side plate, wherein the bottom plate is opposite the shelf and non-parallel with the shelf.

18. The collapsible convection oven system of claim 11, wherein the convection oven further comprises:

a front plate opposite the back plate, the front plate comprising:
  a first opening disposed between the shelf and a bottom plate; and
  a second opening disposed between the top plate and the shelf.

19. The collapsible convection oven system of claim 11, wherein the first side plate and the second side plate of the convection oven each comprise a handle.

20. The collapsible convection oven system of claim 11, wherein the convection oven does not include a separate fastener or a separate hinge.

* * * * *